United States Patent
Noworolski et al.

(10) Patent No.: US 6,317,342 B1
(45) Date of Patent: Nov. 13, 2001

(54) ELECTROSTATIC MICRORESONANT POWER CONVERSION

(75) Inventors: J. Mark Noworolski, San Francisco; Seth R. Sanders, Berkeley, both of CA (US)

(73) Assignee: Munetix, Inc., Berkeley, CA (US)

( * ) Notice: Subject to any disclaimer, the term of this patent is extended or adjusted under 35 U.S.C. 154(b) by 0 days.

(21) Appl. No.: 09/401,310

(22) Filed: Sep. 23, 1999

Related U.S. Application Data

(60) Provisional application No. 60/150,612, filed on Aug. 24, 1999.

(51) Int. Cl.[7] .................................................. H02M 3/18
(52) U.S. Cl. ................................................................ 363/59
(58) Field of Search ........................ 363/59, 60; 323/282, 323/351

(56) References Cited

U.S. PATENT DOCUMENTS 6,049,702 * 4/2000 Tham et al. ............................ 455/78

OTHER PUBLICATIONS

Yachi et al., "A new planar microtransformer for use in micro–switching converters," *PESC*, pp. 20–26, Jun. 1991.

J. Noworolski, "Self–Aligned Polysilicon MEMS Reduced Mask Count Surface Micromachining," *Proceedings of SPI, Micromachined Devices and Components*, vol. 3514, Sep. 1998 (6 pages).

Jochen Franz et al., "A Silicon Microvale With Integrated Flow Sensor", Robert Bosch GmbH, Automotive Equipment Division 8 Tubingerstrasse 123, Reutlingen, Germany, Transducers '1995, The 8th International Converence on Solid–State Sensors and Actuators, and Eurosensors IX, Jun. 25–29, 1995, pp. 313–316.

William C. Tang et al, "Laterally Driven Polysilicon Resonant Microstructures", University of CA at Berkeley, IEEE, 1989, pp. 53–59.

Meng–Hsiung Kiang et al., "Actuated Polysilicon Micromirrors For Raster–Scanning Displays", University of CA at Berkeley, IEEE, 1997, pp. 323–326.

David A. Horsley et al., "Design and Feedback Control Of Electrostatic Actuators For Magnetic Disk Drives", Berkeley Sensor and Actuator Center, University of CA at Berkeley (5 pages) No Date.

J. Mark Noworolski, "Micromechanical Power Conversion", University of CA at Berkeley, Spring 1998. pp. 1–115.

J. Mark Noworolski, et al., "Microresonant devices for power conversion", Department of Electrical Engineering and Computer Science, University of California, Berkeley "No Date".

J. Mark Noworolski, et al., "An Electrostatic Microresonant Power Conversion Device", department of Electrical Engineering and Computer Science, University of California, Berkeley "No Date".

* cited by examiner

*Primary Examiner*—Adolf Deneke Berhane
(74) *Attorney, Agent, or Firm*—Burns, Doane, Swecker & Mathis, L.L.P.

(57) ABSTRACT

The present invention, generally speaking, provides an inductor-free power converter based on mechanical resonance using a single MEM device. Mechanical resonance and silicon strain energy are used as building blocks for a power converter, such as a boost converter. In such a "micromechanical boost converter," arbitrary step-up voltages can be developed using only a single micromechanical component. A dramatic improvement in power density is obtained as compared to conventional capacitor and inductor technologies. For typical MEM applications, such a converter, operating without discrete parts, can readily be fabricated together with the MEM device it powers. For non-MEM applications (e.g., the on-chip generation of high voltages, as for EEPROM programming, for example), the improvement in power density offers significant benefits, particularly for portable equipment.

20 Claims, 3 Drawing Sheets

▨ PSG     ▩ Polysilicon
▭ Nitride     ▭ Substrate

ELECTROSTATIC MICRORESONANT POWER CONVERSION

This application is a continuation-in-part of provisional application No. 60/150,612 filed Aug. 24, 1999, incorporated herein by reference.

BACKGROUND OF THE INVENTION

1. Field of the Invention

The present invention relates to power conversion and to micro-electromechanical (MEM) devices.

2. State of the Art

A large proportion of present power electronics research focuses on miniaturization of power converters. The goal is to maximize efficiency and power density. Power densities of approximately 50 W/cm$^3$ have been reported in the literature for discrete switch-mode supplies. Efforts at miniaturizing power converters often are hampered by the difficulty of integrating magnetic components with other circuit elements using existing processing technology. In the area of micromachined electrostatic sensor and actuators, for example, such sensors and actuators often require high voltages for proper operation. Currently, these voltages must be generated off-chip, because magnetic components are generally unavailable in ICs.

One interesting approach integrates an inductor with a capacitor using microstrip theory. This method permits the manufacture of integrated LC structures suitable for power conversion applications. Apparently, these devices are not compatible with existing planar integrated circuit technology. Yachi et al. ("A new planar microtransformer for use in micro-switching converters," *PESC*, pp. 20–26, June 1991) outlines a planar microtransformer manufactured by dry process techniques using Cu, Ta, and CoZrRe as the magnetic material. This process apparently permits integration of a microtransformer with power semiconductor devices. A problem with this device is the large series resistance of the device, apparently caused by the contact resistance between the two separate metallization steps needed to define the coil. Another approach for constructing integrated power supplies has been based on the methodology of switched capacitor circuits. Drawbacks of this approach include lack of isolation and inherent switching losses.

An electrostatic microresonant power conversion devices is described in a paper of the same name, *IEEE PESC*, Vol. II. pp. 997–1002, 1992, by the present inventors. As described therein, the approach followed is to replace the LC tank in a resonant converter with a micromechanical device, thereby avoiding the fabrication of magnetic components. Two micromechanical devices are coupled in tandem. Isolation and energy transfer between primary and secondary ports is achieved with an insulating mechanical coupling. The device is manufactured by planar techniques using readily available silicon processing equipment. This compatibility permits integration of the device with semiconductor devices to yield a monolithic power supply.

The foregoing approach, while effective, requires a high voltage bias supply, the conventional generation of which decreases the utility of the design. There remains a need for improved MEM-based power conversions devices.

SUMMARY OF THE INVENTION

The present invention, generally speaking, provides an inductor-free power converter based on mechanical resonance using a single MEM device. Mechanical resonance and silicon strain energy are used as building blocks for a power converter, such as a boost converter. In such a "micromechanical boost converter," arbitrary step-up voltages can be developed using only a single micromechanical component. A dramatic improvement in power density is obtained as compared to conventional capacitor and inductor technologies. For typical MEM applications, such a converter, operating without discrete parts, can readily be fabricated together with the MEM device it powers. For non-MEM applications (e.g., the on-chip generation of high voltages, as for EEPROM programming, for example), the improvement in power density offers significant benefits, particularly for portable equipment.

BRIEF DESCRIPTION OF THE DRAWING

The present invention may be further understood from the following description in conjunction with the appended drawing. In the drawing:

FIG. 6, including FIG. 6(a) through FIG. 6(f), illustrates a fabrication sequence of the micromechanical boost converter circuit of FIG. 1;

DETAILED DESCRIPTION OF THE PREFERRED EMBODIMENTS

Figure 1:
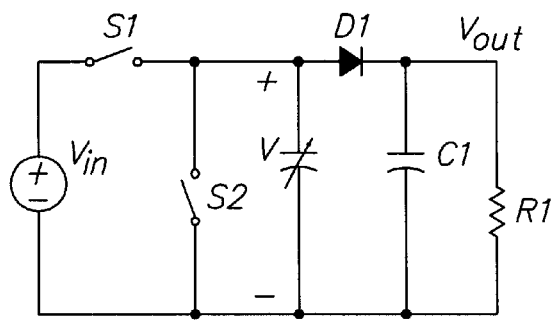
FIG. 1 is a circuit diagram of an example of a micromechanical boost converter circuit.

Referring now to FIG. 1, a circuit diagram is shown of an exemplary MEM-resonator-based power converter in accordance with one embodiment of the invention. Connected in parallel are a voltage source (the motive power source of which may be electrical or mechanical), a switch S2, a variable capacitor in the form of a MEM resonator, a fixed, discrete capacitor C1 and a resistor R1. Between the voltage source and the switch S2 is connected a switch S1. Between the variable capacitor and the fixed capacitor is connected a diode D1.

Figure 2:
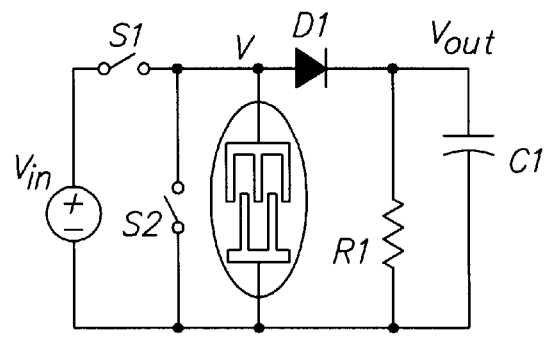
FIG. 2 is a circuit diagram like that of FIG. 1, showing the variable capacitor to be a MEM resonator.

The variable capacitor may be realized in various forms, e.g., as a one-port comb drive resonator, a parallel plate resonator, etc. Referring to FIG. 2, a circuit diagram is shown of a power converter using a one-port comb drive resonator as the variable capacitor. Such resonators are themselves known in the art.

As compared to prior MEM-based power converters, the power converter of FIG. 2 generates high voltages using a single MEM device. The micromechanical boost converter shown uses the strain energy stored in a conventional capacitively driven electrostatic resonator to perform step-up conversion of the input voltage. The manner in which this conversion is accomplished will presently be described.

Step-up conversion occurs in two phases, a "pump-up" phase and a "boost" phase. During the pump-up phase, strain energy is accumulated in the MEM resonator. During the boost phase, this energy is withdrawn from the resonator is such a manner as to produce a high voltage.

Basically, during each pump-up phase, the variable capacitor is alternately charged and discharged at the resonant frequency of the resonator. In order to charge the variable capacitor, the switch S1 is closed and the switch S2 is opened. In order to discharge the variable capacitor, the switch S1 is opened and the switch S2 is closed. The effect of such switching is to apply a square-wave voltage waveform to the MEM resonator, the voltage waveform having a frequency at or near the resonant frequency of the MEM resonator. A further effect of this square wave voltage waveform is to effect motion of the MEM resonator.

Figure 3:
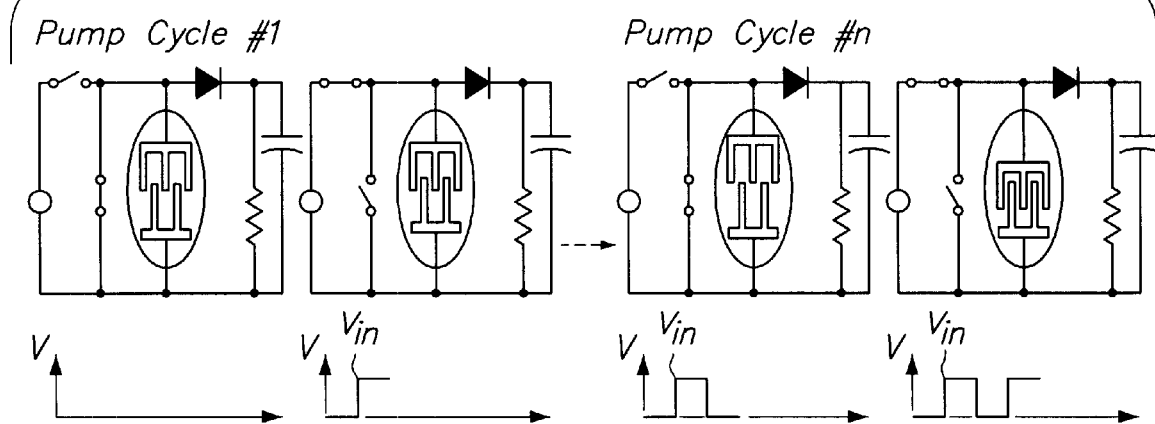
FIG. 3 is a diagram showing a series of "pump" cycles.

Referring to FIG. 3, there is illustrated a series of such pump cycles. In each pump cycle the capacitor is first discharged, then charged. This results in mechanical deflection of the MEM device. At first, such deflection is relatively slight. Progressively, over the course of repeated cycles, the deflection becomes increasingly greater until it reaches a desired level.

Figure 4:
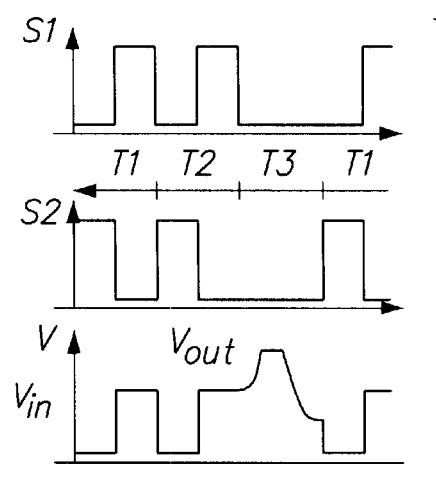
FIG. 4 is a waveform diagram illustrating operation of the micromechanical boost converter circuit of FIG. 1.

Referring to FIG. 4, following the pump-up phase, the boost phase is initiated by opening both switches S1 and S2, coincident with the deflection phase of the MEM device at which maximum strain energy is stored in the MEM device. That is, at the end of the n-th pump cycle, when the device capacitance is maximum valued, both switches are left off. This condition allows the capacitor value to ring down under a constant charge condition. Charge conservation dictates that its voltage increase, eventually reaching Vout and subsequently delivering energy to the load through the diode D1.

At first glance the micromechanical boost circuit may appear to be similar to a charge pump or capacitive multiplier circuit. However, the two circuits are fundamentally different. In a micromechanical boost converter, the stored spring energy in a MEM device is used to perform an arbitrary boost function (up to approximately 15×) using, only one component (the MEM device). An important concept is that of mechanical resonance. In contrast, a charge pump requires approximately N components (capacitors) to step-up by a factor of N. In charge pumps, mechanical energy is non-existent and irrelevant. Using the micromechanical boost converter, power densities much greater than those of charge pump circuits can be attained.

Calculations show that step-up ratios of approximately 3 are attainable using comb-drive resonators with low parasitic capacitance. Using parallel plate capacitive resonators with low parasitic capacitance, step-up ratios in excess of 15 are attainable. The limiting factor in terms of step-up ratio is generally switch and diode leakages and parasitic capacitances. These issues may be addressed by paralleling a greater number of MEM components to reduce the impact of these effects.

Figure 5:
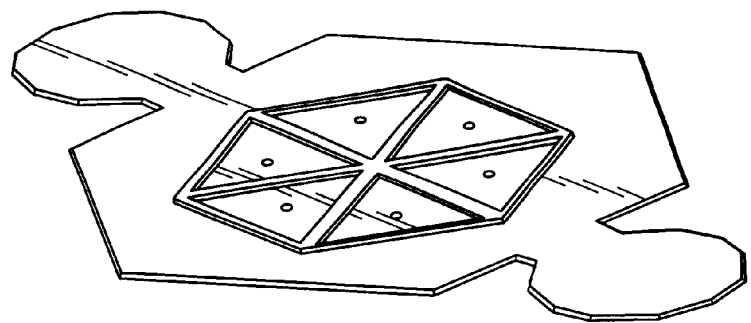
FIG. 5 is a micrograph of a fabricated polysilicon vertical resonator for boost conversion.

Referring to FIG. 5, a micrograph is shown of an advantageous polysilicon vertical resonator that may be used for boost conversion. The geometry of the parallel plate resonator has been optimized for maximum power delivery. In particular, a central hexagonal polysilicon-rib stiffened area is provided that improves the boost function. The function of the stiffening ribs is two-fold: first, to raise the resonant frequency of the device; second, to maintain as high a capacitance variation as possible. From a power density perspective, these are both desirable features. Furthermore, calculations show that smaller device geometries generally scale well to improved values of power density, in contrast to the scaling properties of electromagnetic components.

FIG. 6 illustrates the basic fabrication sequence using a low mask count, low parasitic capacitance, self-aligned micromachined polysilicon-on-nitride process. The partial cross-section of FIG. 6 may be imagined as intersecting two edges of one of the six triangular sections circumscribed by the ribs in FIG. 5 as well as a center aperture of the triangular section, and extending outward to the edge of the polysilicon plate.

Figure 6A:
Figure 6B:
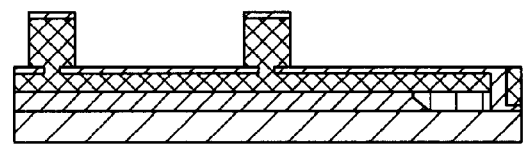
Figure 6B:
Figure 6E:
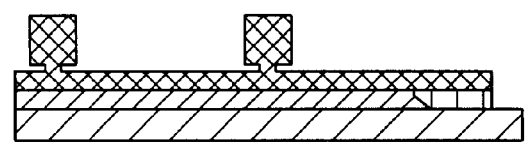
Figure 6C:
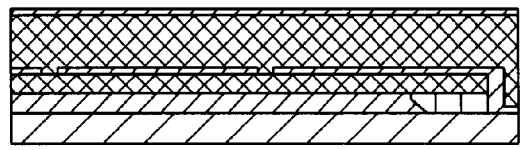
Figure 6F:
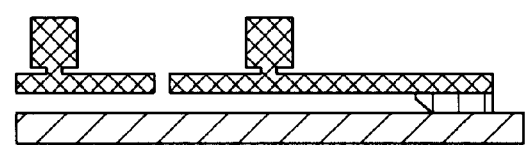

Referring to FIG. 6(a), the fabrication sequence begins with a membrane fabricated according to the SAMPSON process as described in J. Noworolski, "self-alined polysilicon MEMS reduced mask count surface micromachining," *Proceedings of SPI, Micrormachined Devices and Components*, Vol. 3514, September 1998, incorporated herein by reference. The membrane consists of a substrate, a sacrificial PSG (phosphosilicate glass) layer surrounded by a nitride boundary, and an upper polysilicon layer. A mask layer of LTO (low-temperature oxide) is then deposited and patterned (FIG. 6(b)), the oxide being removed where the ribs are to attach to the polysilicon plate. A layer of stiffening polysilicon is then deposited, followed by an LTO mask layer, followed by an annealing step, the results of which are shown in FIG. 6(c). The LTO and stiffening polysilicon are then patterned and etched (FIG. 6(d)). An HF then follows to remove "stringers"(FIG. 6(e)). Finally, a release hole is patterned and etched, followed by an HF etch, which removes the sacrificial PSG layer, resulting in the completed drum-like structure.

Although numerous other fabrication methods may be used, the foregoing fabrication method is advantageous in terms of mask steps and self-alignment.

Furthermore, although in the foregoing description an electrical power source has been used for locomotion, the motion can in fact be derived from mechanical power. For example, a sensor may be incorporated within the structure of a vehicle wheel. In such an instance, the rotational energy of the wheel may be harnessed to produce the output voltage. Also, the rotational energy of the wheel may be used to produce the input voltage, for example by piezoelectic means.

Figure 7:
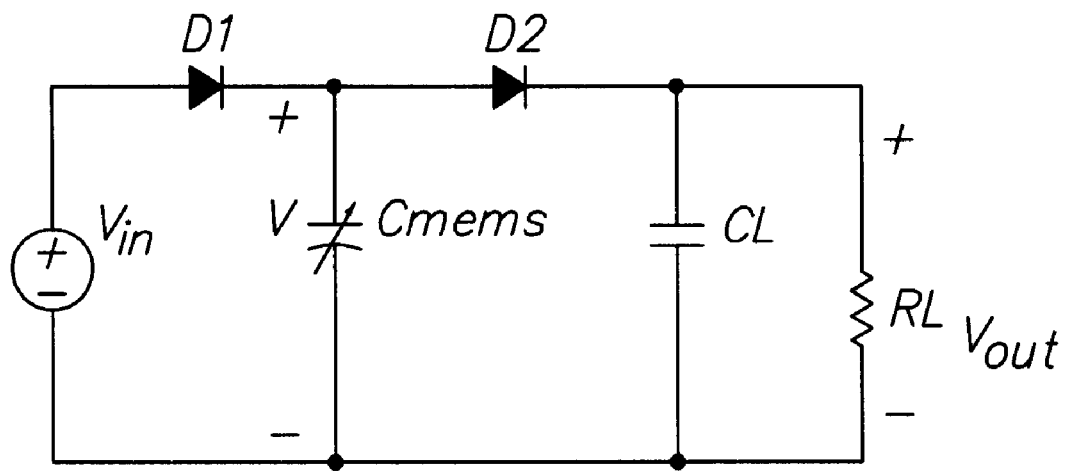
FIG. 7 is a circuit diagram of an example of a mechanically excited micromechanical boost converter.

An example of such a mechanically excited micromechanical boost converter is shown in FIG. 7. As compared to the boost converter of FIG. 1, the mechanically excited micromechanical boost converter of FIG. 7 does not require the switches S1 and S2. Instead, the diodes D1 and D2 achieve a "soft switching" action. Not shown in FIG. 7 is an external mechanical excitation field, which serves to shake the circuit up and down. This mechanical motion occurs at a frequency comparable to the mechanical resonant frequency of the electromechanical component Cmems, causing it to move appreciably.

Figure 8:
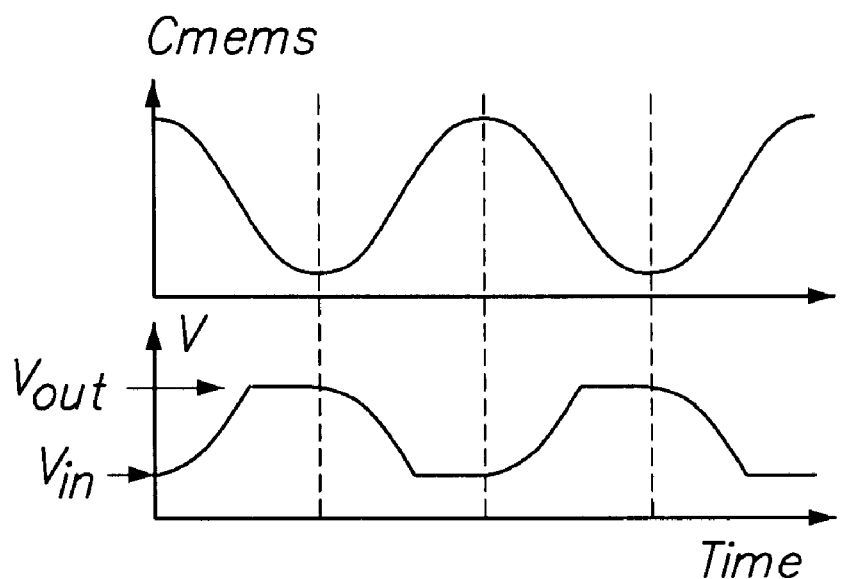
FIG. 8 is a waveform diagram illustrating operation of the micromechanical boost converter circuit of FIG. 7.

FIG. 8 shows waveforms associated with a sample operating point. In operation, as Cmems decreases from its maximum value, the voltage on it increases from Vin. Until the voltage reaches Vout, neither the diode D1 nor the diode D2 conducts. Once vout is reached, the diode D2 begins to conduct and energy is delivered to the load CL, RL until Cmems reaches it minimum value.

Once Cmems begins again to increase, the diode D2 ceases to conduct, and the voltage decreases until it reaches Vin. At this point, the diode D1 begins to conduct, transferring energy from Vin to the MEM component until Cmems reaches its maximum value. The cycle then repeats.

The circuit implementation of FIG. 7, because it uses soft switching, is extremely efficient.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. An energy conversion method using a single micromechanical resonator, comprising:

during a first phase of operation, storing energy within the micromechanical resonator; and during a second subsequent phase of operation, withdrawing electrical energy from the micromechanical resonator.

2. The method of claim 1, wherein voltage step-up or step-down is performed.

3. The method of claim 1, wherein the first phase of operation comprises multiple cycles in each of which an element of the micromechanical resonator undergoes reciprocating motion.

4. The method of claim 1, wherein the micromechanical resonator is an electrostatic device.

5. The method of claim 3, wherein the micromechanical resonator acts as variable capacitor.

6. The method of claim 1, wherein energy stored within the micromechanical resonator is derived from an electrical source.

7. The method of claim 1, wherein energy stored within the micromechanical resonator is derived from a mechanical source.

8. The method of claim 1, wherein the single micromechanical resonator is directly connected to an energy source for receiving an input and supplies an output voltage directly to a load.

9. A micromechanical power converter, comprising:

an energy source;

a single micromechanical resonator coupled to the energy source;

means coupled to the micromechanical resonator, during a first phase of operation, storing energy from the energy source within the micromechanical resonator; and means coupled to the micromechanical resonator for, during a second subsequent phase of operation, withdrawing electrical energy from the micromechanical resonator.

10. The apparatus of claim 9, wherein the means for storing and the means for withdrawing comprise a first switch and a second switch.

11. The apparatus of claim 10, wherein the means for withdrawing comprises a load device and a diode.

12. The apparatus of claim 9, wherein the micromechanical resonator is an electrostatic device.

13. The apparatus of claim 9, wherein the micromechanical resonator acts as capacitor.

14. The apparatus of claim 9, wherein the micromechanical resonator is one of the following: a parallel plate resonator and a comb resonator.

15. The apparatus of claim 14, where the parallel plate resonator incorporates a stiffened central area, and moves in an out-of-plane direction.

16. The apparatus of claim 14, where the parallel plate resonator incorporates a stiffened central area and moves in an in-plane direction.

17. The apparatus of claim 9 operating in conjunction with a control circuit to effect a well-controlled output voltage.

18. The apparatus of claim 14 where the micromechanical resonator is fabricated using surface micromachining, bulk micromachining, or DRIE etching techniques.

19. The apparatus of claim 14 where the micromechanical resonator is fabricated using self-aligned micromachining.

20. The apparatus of claim 9, wherein the single micromechanical resonator is directly connected to an energy source for receiving an input and supplies an output voltage directly to a load.

* * * * *